United States Patent [19]

Makino

[11] Patent Number: 5,136,412
[45] Date of Patent: Aug. 4, 1992

[54] Fθ LENS AND SCANNING OPTICAL SYSTEM USING THE SAME
[75] Inventor: Jun Makino, Yokohama, Japan
[73] Assignee: Canon Kabushiki Kaisha, Tokyo, Japan
[21] Appl. No.: 627,585
[22] Filed: Dec. 14, 1990
[30] Foreign Application Priority Data Dec. 20, 1989 [JP] Japan .................. 1-330648

[51] Int. Cl.⁵ .................. G02B 26/10; G02B 9/12
[52] U.S. Cl. .................. 359/206; 359/217; 359/218; 359/784
[58] Field of Search .............. 350/474, 6.8; 359/206, 359/217, 218, 784

[56] References Cited

U.S. PATENT DOCUMENTS 4,756,583 7/1988 Morimoto .................. 350/474 X
4,756,584 7/1988 Takanashi .................. 350/6.8

FOREIGN PATENT DOCUMENTS

60-153017 8/1985 Japan .................. 350/474
62-200314 9/1987 Japan .................. 350/474

Primary Examiner—Scott J. Sugarman
Attorney, Agent, or Firm—Fitzpatrick, Cella, Harper & Scinto

[57] ABSTRACT

An fθ lens having a skew correction function for use in a scanning optical system comprises a first lens having a negative power in a main scan plane, a second lens having a positive power in the main scan plane and arranged next to the first lens, a third lens having a toric plane and a positive power in the main scan plane and arranged next to the second lens, and an air lens formed between the first lens and the second lens having a positive power in the main scan plane.

12 Claims, 12 Drawing Sheets

Fθ LENS AND SCANNING OPTICAL SYSTEM USING THE SAME

BACKGROUND OF THE INVENTION

1. Field of the Invention

The present invention relates to an fθ lens used in a scanning optical system, and more particularly to an fθ lens for forming a fine spot and a laser scanning optical system using the same.

2. Related Background Art

In a prior art laser scanning optical system, a laser beam emitted by a laser light source is collimated by a collimater lens, reflected by a deflector such as a polygon mirror, and a laser beam spot is formed on an image plane by a focusing lens system and it is scanned.

In such a laser scanning optical system, where the beam is scanned at a constant angular speed such as a polygon mirror, a so-called fθ lens system having an fθ characteristic (a theoretical image height is given by fθ where f is a focal distance of the optical system and θ is an incident angle) is used as a focusing lens in order to maintain the constant speed in a main scan direction on the image plane.

In general, since the image plane which is scanned by the beam is planar, an image plane distortion on the image plane is compensated in the focusing lens.

Further, in order to prevent the vibration (ununiformity in pitch) of the scan lines on the image plane due to skew of a reflection plane of a deflector such as a polygon mirror from a predetermined position, an anamorphic optical system such as toric lens is sometimes used in the focusing lens.

An fθ lens having three lenses in the focusing lens system in order to form a fine laser spot (less than 50 μm by a laser having a wavelength λ=780 nm) has been proposed in U.S. Pat. No. 4,674,825. This fθ lens has a construction shown in FIG. 1 in which a concave spherical lens 51, a convex spherical lens 52 and a toric lens 53 are arranged in the order from a mirror plane M of a deflector to an image plane I.

Figure 1:
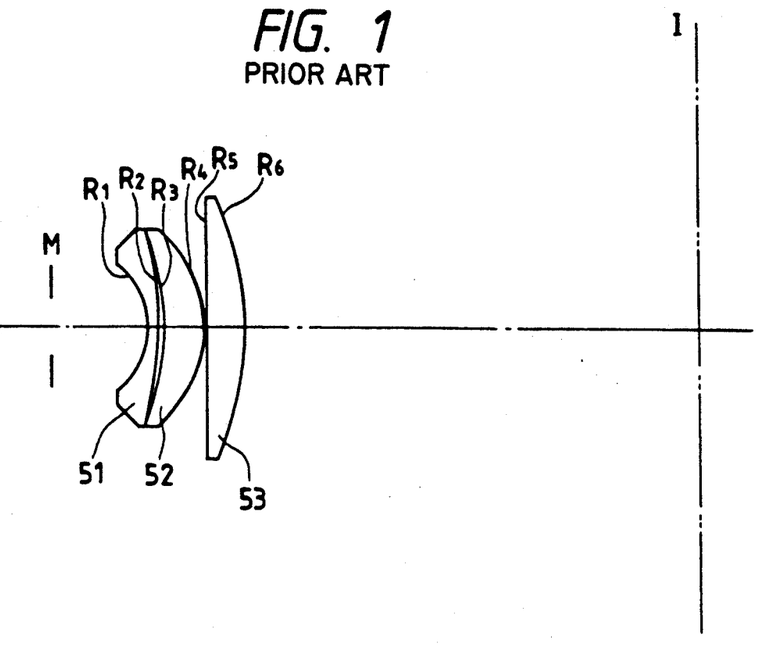
FIG. 1 shows a main scan sectional view in a prior art system.

Data of the scanning lens shown in FIG. 1 is shown below.

TABLE 1

Data of Scanning Lens

| | | |
|---|---|---|
| $R_1 = -31.905$ | | |
| | $D_1 = 4.70$ | $N_1 = 1.51072$ |
| $R_2 = -156.190$ | | |
| | $D_2 = 2.095$ | $N_2 = 1$ |
| $R_3 = -107.660$ | | |
| | $D_3 = 16.7$ | $N_3 = 1.76591$ |
| $R_4 = -52.701$ | | |
| | $D_4 = 1.0$ | $N_4 = 1$ |
| $R_5(*1) = \infty$ | | |
| | $D_5 = 16.1$ | $N_5 = 1.78569$ |
| $R_6(*1) = -131.56$ | | |
| f = 170.4 mm | image angle ±37.5° | |
| $F_{NO} = 4$ | wavelength 780 nm | |

(*1) Toric lens. In a sub-scan direction,
$R_5 = -157.46$
$R_6 = -38.208$

In the Table 1, Ri is a radius of curvature of the i-th lens plane as counted from the mirror plane M of the deflector, Di is a plane-to-plane distance from the i-th lens plane to the (i+1)th lens plane, and Ni is a refractive index of a medium behind the i-th lens plane.

However, in the above three-lens fθ lens system, a spot shape is materially degraded and the shape may be distorted to a triangle in a peripheral area of a large image angle (scanning angle) image plane even if the fθ characteristic, the image plane distortion and the skew correction are met. As a result, an effective spot diameter increases. Thus, in the prior art lens system, a high quality image is not attained in the peripheral area of the image plane.

Figure 2:
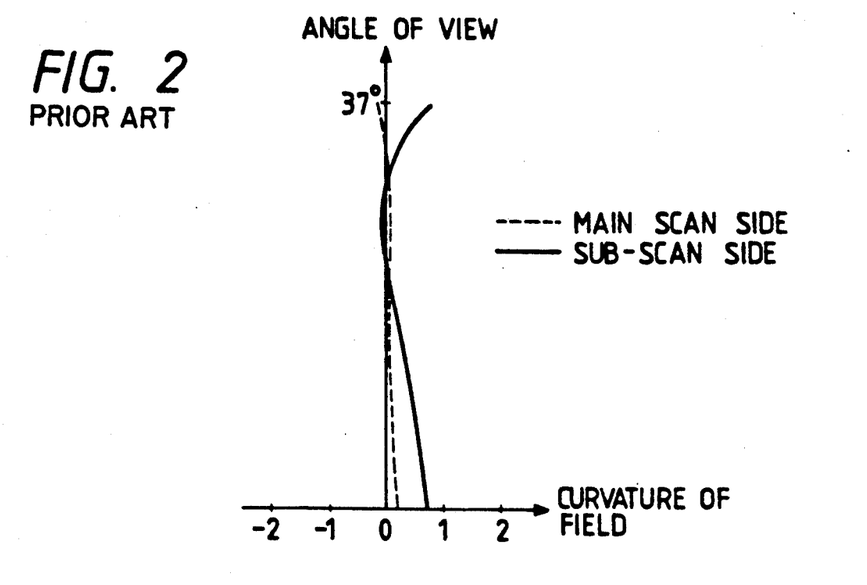
FIG. 2 shows an image plane distortion in the prior art system.
Figure 3:
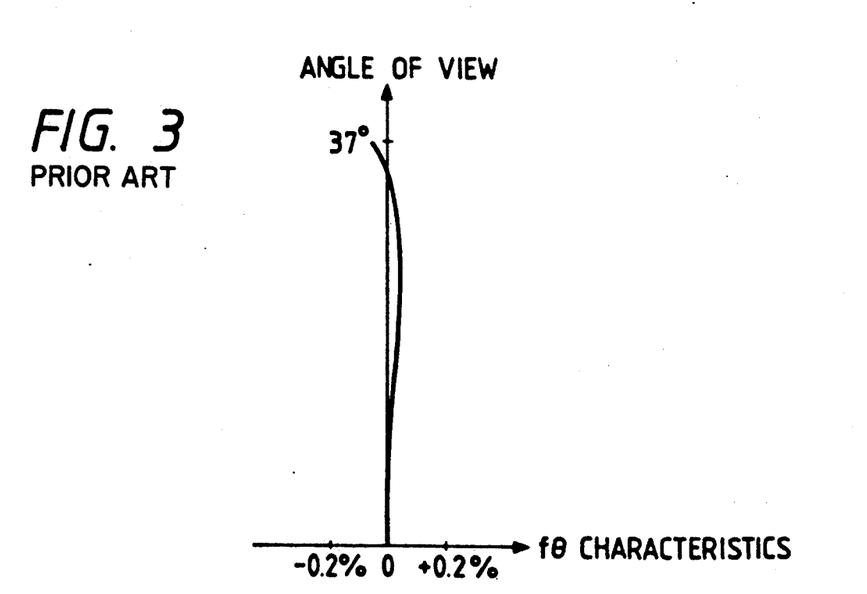
FIG. 3 shows an fθ characteristic in the prior art system.
Figure 4:
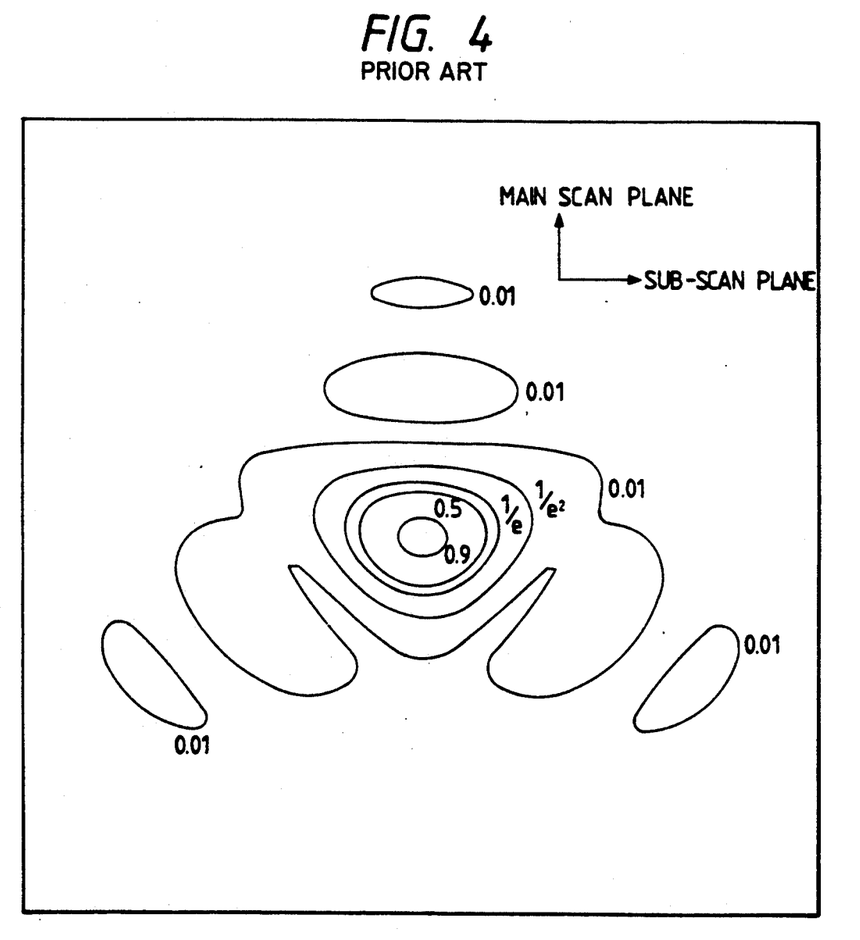
FIG. 4 shows a spot shape at an image angle of 37 degrees in the prior art.

The image plane distortion of the fθ lens shown in FIG. 1 and the fθ characteristic are shown in FIGS. 2 and 3. A spot shape on the image plane at an image angle of 37 degrees is shown in FIG. 4.

As seen from those charts, the fθ characteristic and the image plane distortion are well compensated in the present example but the spot shapes of $1/e^2$ (spot shapes from the peak intensity to $1/e^2$ intensity) are triangular and good spot shape is not attained. As a result, in this fθ lens, the quality of the image in the peripheral area of the image plane is degraded.

SUMMARY OF THE INVENTION

It is an object of the present invention to provide an fθ lens to be used in a compact and high resolution scanning optical system.

In order to achieve the above object, in accordance with the present invention, a three-lens fθ lens including a toric lens is provided. The first lens as viewed from a light incident side is one having a negative power in a main scan plane, a second lens is one having a positive power in the main scan plane, and the third lens is one having a tornic plane and a positive power in the main scan plane. Further, an air lens formed between the first lens and the second lens has a positive power in the main scan plane. As a result, the spot shape in the peripheral area of the image plane is kept in good quality and the scanning optical system which is compact in overall scanning system and yet of high resolution is attained.

DETAILED DESCRIPTION OF THE PREFERRED EMBODIMENTS

Figure 5:
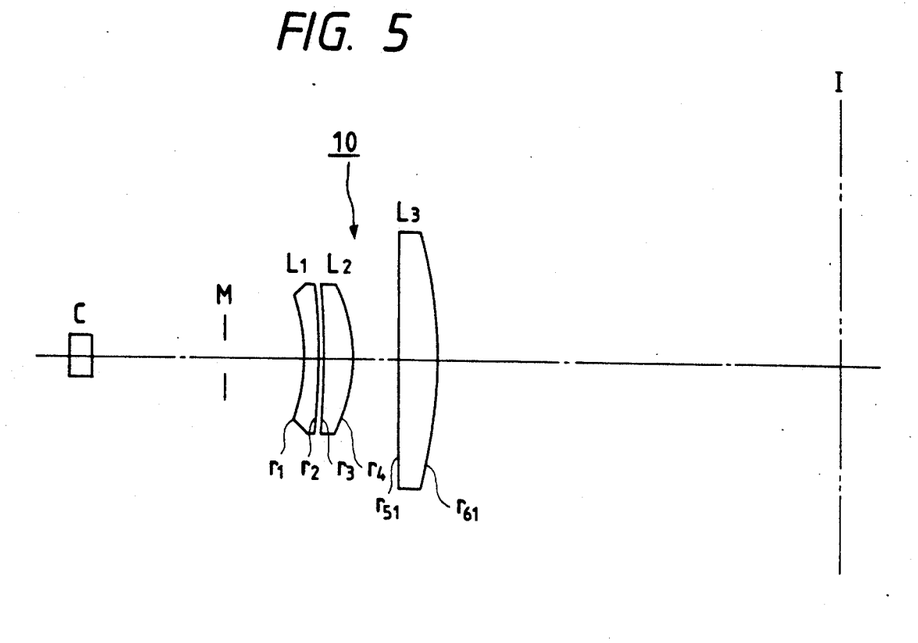
FIG. 5 shows a main scan sectional view in a first embodiment.
Figure 6:
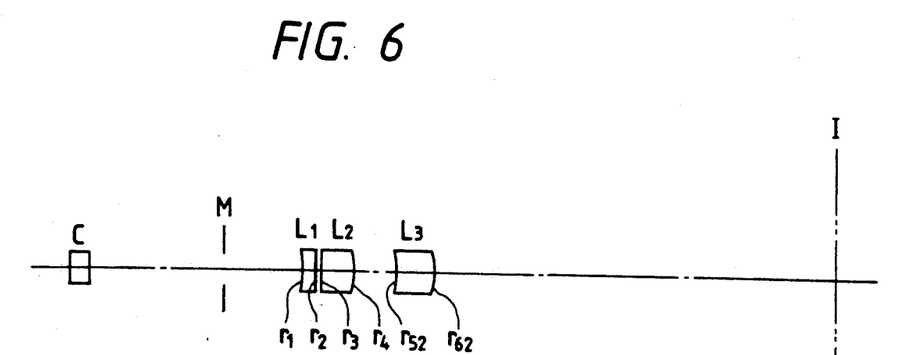
FIG. 6 shows a sub-scan sectional view in the first embodiment.

FIGS. 5 and 6 show a first embodiment of the present invention. FIG. 5 shows a sectional view of an $f\theta$ lens of the present invention, taken along a main scan plane (which is formed by a light beam to be scanned and includes an optical axis), and FIG. 6 shows a sectional view of the $f\theta$ lens taken along a sub-scan plane (which is orthogonal to the main scan plane and includes the optical axis).

The $f\theta$ lens 10 comprises a concave spherical lens $L_1$, a convex spherical lens $L_2$ and a toric lens $L_3$ arranged in this sequence as viewed from a mirror plane position M of a deflector to an image plane I. A symbol c denotes a cylindrical lens arranged between a light source such as a laser and the mirror plane position M. It has a power only in a sub-scan direction.

In FIGS. 5 and 6, $r_1$ and $r_2$ denote radii of curvature of a first plane and a second plane (counted from M) of the concave spherical lens $L_1$, $r_3$ and $r_4$ denote radii of curvature of a third plane and a fourth plane of the convex spherical lens $L_2$, $r_{51}$ and $r_{61}$ denote radii of curvature, in the main scan sectional plane, of a fifth plane and a sixth plane of the toric lens $L_3$, and $r_{52}$ and $r_{62}$ denote radii of curvature, in the sub-scan sectional plane, of the fifth plane and the sixth plane.

Figure 7:
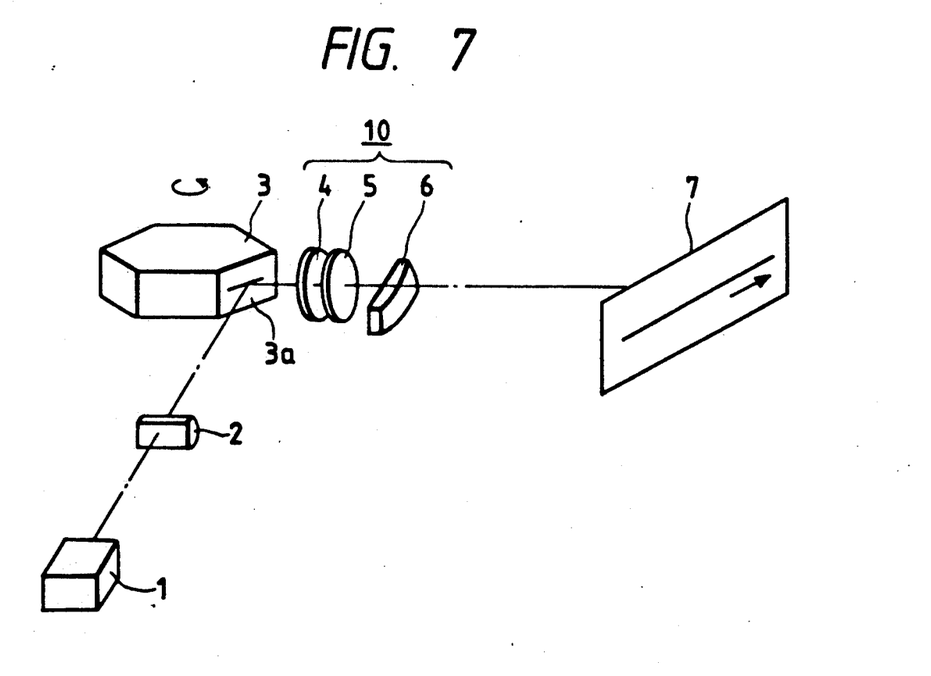
FIG. 7 shows a scanning optical system which uses the fθ lens of the present invention.

FIG. 7 shows a construction of a scanning optical system which uses the $f\theta$ lens of the present invention. It comprises a light source unit 1 including a light source or the light source and a collimeter lens, a linear image focusing system 2 having a cylindrical lens for linearly focusing a light beam emitted from the light source unit 1, and a deflector 3 having a deflecting reflection plane $3a$ arranged in a vicinity of a position at which the light beam is linearly focused by the linear image focusing system 2. Arranged between the deflector 3 and a medium 7 to be scanned are a spherical concave single lens 4, a spherical convex single lens 5 and a single lens 6 having a toric plane which has a main axis and a sub-axis of different defraction powers in two orthogonal directions. A focused spot is formed on the medium 7 by the combined system of those lenses and the medium 7 is scanned by the spot as the deflector 3 is rotated.

The $f\theta$ lens 10 having the skew fall-down correction function comprises the spherical concave single lens 4, the spherical convex single lens 5 and the single lens 6 having the toric plane, as described above.

The laser beam emitted from the light source is collimated by the collimeter lens 10, linearly directed to the vicinity of the mirror plane M of the deflector through the cylinder lens, deflected thereby and focused onto the image plane I. Thus, the laser beam is focused on the mirror plane M of the deflector by the cylindrical lens in the sub-scan sectional plane, and then focused again by the $f\theta$ lens onto the image plane I.

A specific example of the $f\theta$ lens is shown in Table 2, in which $r_1$ etc. are same as those mentioned above, $d_0$ is a distance between the mirror plane M and the first plane, $d_i$ ($i=1\sim5$) is a distance between the i-th plane and the (i−1)th plane, $d_6$ is a distance between the sixth plane and the image plane I, $n_0$, $n_2$, $n_4$ and $n_6$ are refractive indices of air, and $n_1$, $n_3$ and $n_5$ are refractive indices of the lenses $L_1$, $L_2$ and $L_3$, respectively.

TABLE 2

| | | |
|---|---|---|
| $r_1 = -53.00$ | $d_0 = 17.61$ | $n_0 = 1$ |
| | $d_1 = 4.05$ | $n_1 = 1.51$ |
| $r_2 = -186.30$ | | |
| | $d_2 = 0.28$ | $n_2 = 1$ |
| $r_3 = -319.60$ | | |
| | $d_3 = 8.00$ | $n_3 = 1.62$ |
| $r_4 = -49.19$ | | |
| | $d_4 = 12.34$ | $n_4 = 1$ |
| $r_{51} = 0$ | | |
| $r_{52} = -36.05$ | | |
| | $d_5 = 14.18$ | $n_5 = 1.62$ |
| $r_{61} = -112.31$ | | |
| $r_{62} = -15.89$ | | |
| | $d_6 = 97.31$ | $n_6 = 1$ |
| | $f = 100$ | |

As seen from Table 2, an air lens is formed between the lenses $L_1$ and $L_2$ by the second plane (radius of curvature $r_2$) and the third plane (radius of curvature $r_3$), where $r_3 < r_2 < 0$ (that is, $r_2/r_3 \leq 1$). Accordingly, the air lens has a positive power.

The fact that the air lens has the positive power means that a combined power of the planes $r_2$ and $r_3$ is positive.

Power of plane $r_2$ $$\phi_A = \frac{1 - n_1}{r_2}$$

Power of plane $r_3$ $$\phi_B = \frac{n_3 - 1}{r_3}$$

Combined power $$\phi = \phi_A + \phi_B - e\phi_A\phi_B \qquad (1)$$

where $e = d_2$

Accordingly the fact that the equation is positive means that the air lens has a positive power.

Figure 8:
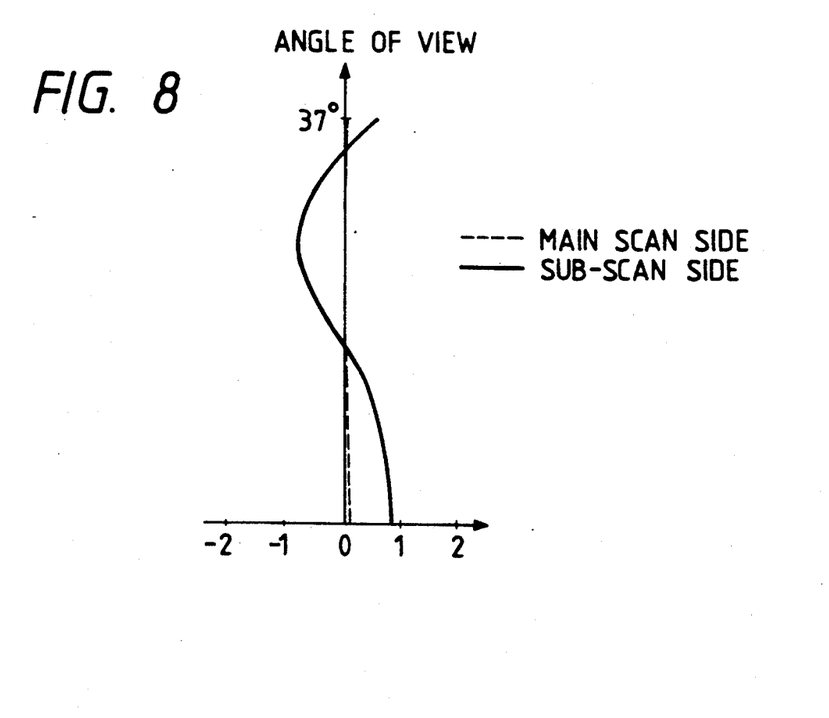
FIG. 8 shows an image plane distortion in the first embodiment.
Figure 9:
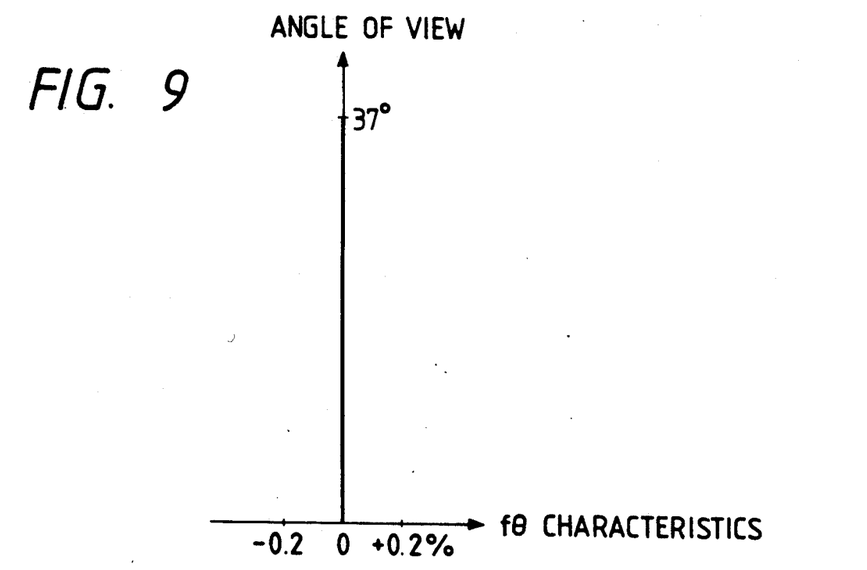
FIG. 9 shows an fθ characteristic in the first embodiment.

The image plane distortion and the $f\theta$ characteristic of the $f\theta$ lens 10 are shown in FIGS. 8 and 9. It is seen that the image plane distortion and the $f\theta$ characteristic in the main scan plane and the subscan plane are good.

Figure 10:
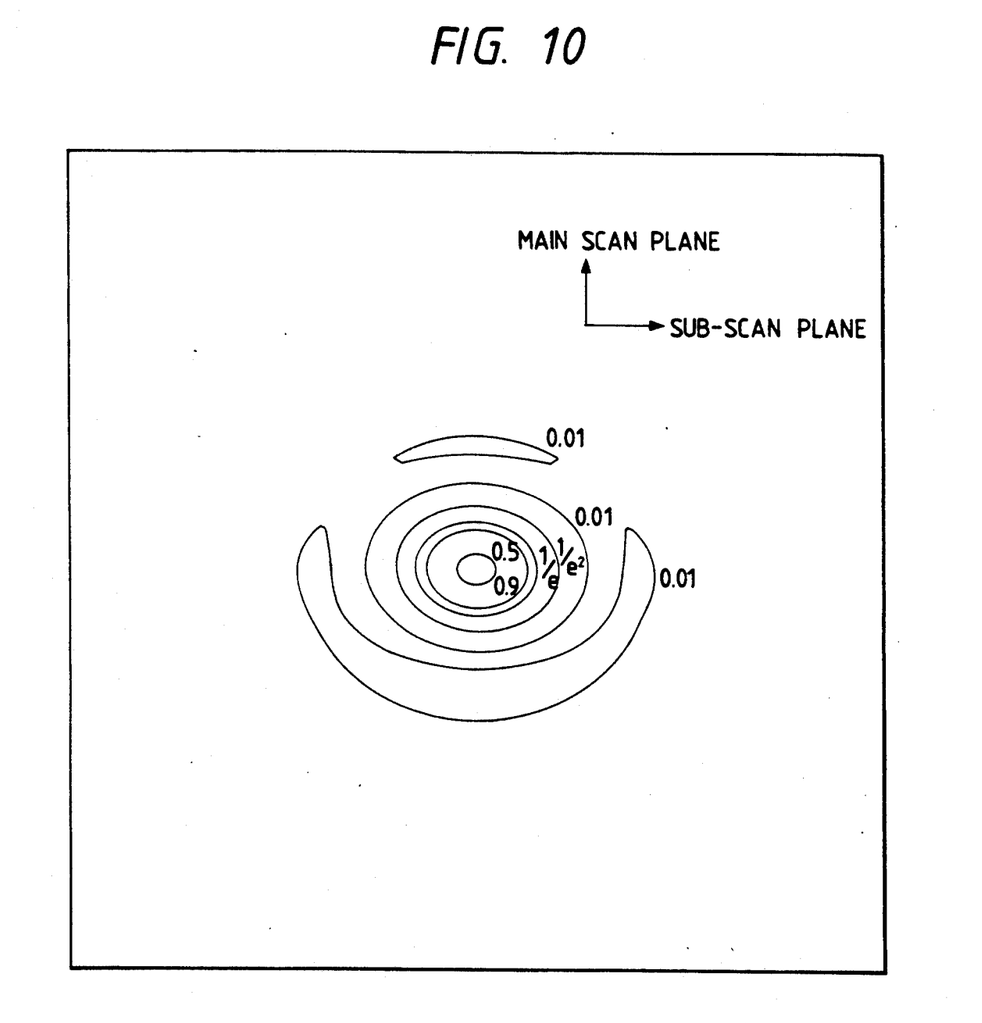
FIG. 10 shows a spot shape at an image angle of 37 degrees in the first embodiment.

FIG. 10 shows the result of calculation of a spot shape at an image angle of 37 degrees by using the $f\theta$ lens 10. The spot is elliptic (a little longer on a sub-scan plane) at a contour line of $1/e^2$, and it is keep of good shape.

Figure 11:
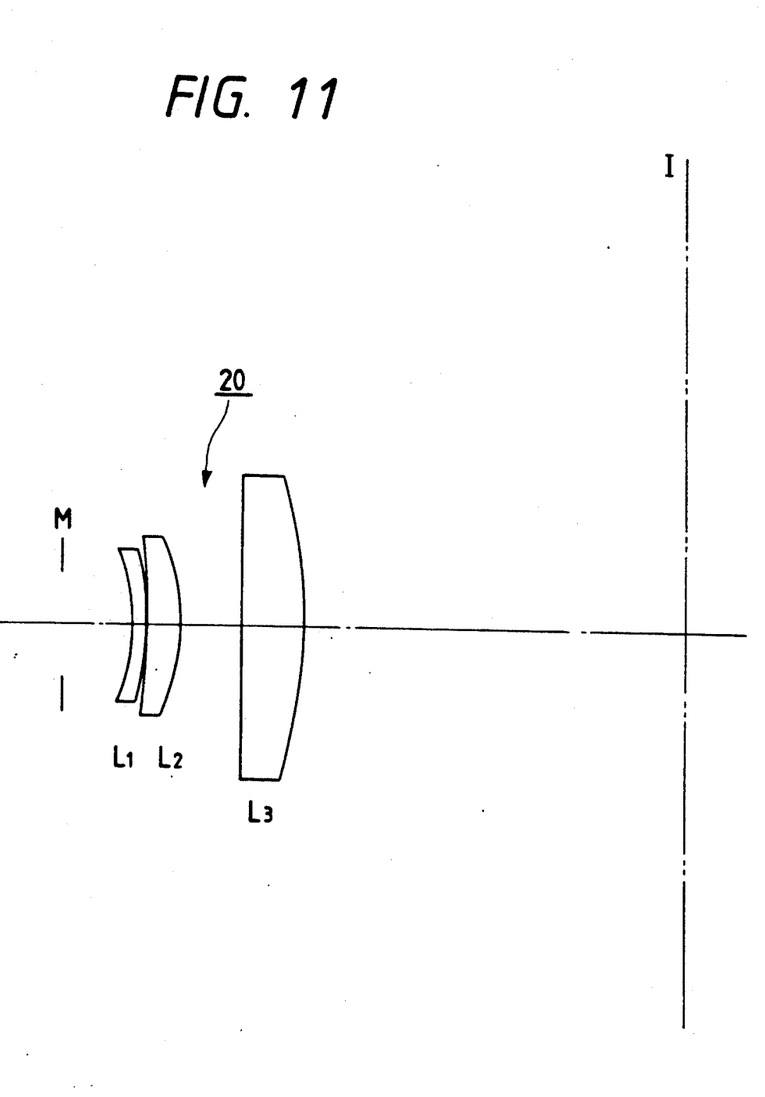
FIG. 11 shows a main scan sectional view of a second embodiment.

FIG. 11 shows a sectional view of a second embodiment of the present invention, taken along the main scan plane. An $f\theta$ lens 20 comprises a concave spherical lens $L_1$, a convex spherical lens $L_2$ and a toric lens $L_3$, arranged in this order as viewed from a mirror plane M.

In the second embodiment, an air lens between the lenses $L_1$ and $L_2$ also has a positive power in the main scan plane.

A specific example of the $f\theta$ lens is shown in Table 3. The convention of symbols is same as that of Table 2.

TABLE 3

| | $d_0 = 18.09$ | $n_0 = 1$ |
|---|---|---|
| $r_1 = -43.26$ | | |
| | $d_1 = 3.00$ | $n_1 = 1.51$ |
| $r_2 = -72.12$ | | |
| | $d_2 = 0.30$ | $n_2 = 1$ |
| $r_3 = -149.50$ | | |
| | $d_3 = 8.49$ | $n_3 = 1.62$ |
| $r_4 = -47.52$ | | |
| | $d_4 = 14.99$ | $n_4 = 1$ |
| $r_{51} = 0$ | | |
| $r_{52} = -35.46$ | | |
| | $d_5 = 16.12$ | $n_5 = 1.62$ |
| $r_{61} = -119.78$ | | |
| $r_{62} = -16.30$ | | |
| | $d_6 = 94.27$ | $n_6 = 1$ |
| | $f = 100$ | |

Figure 12:
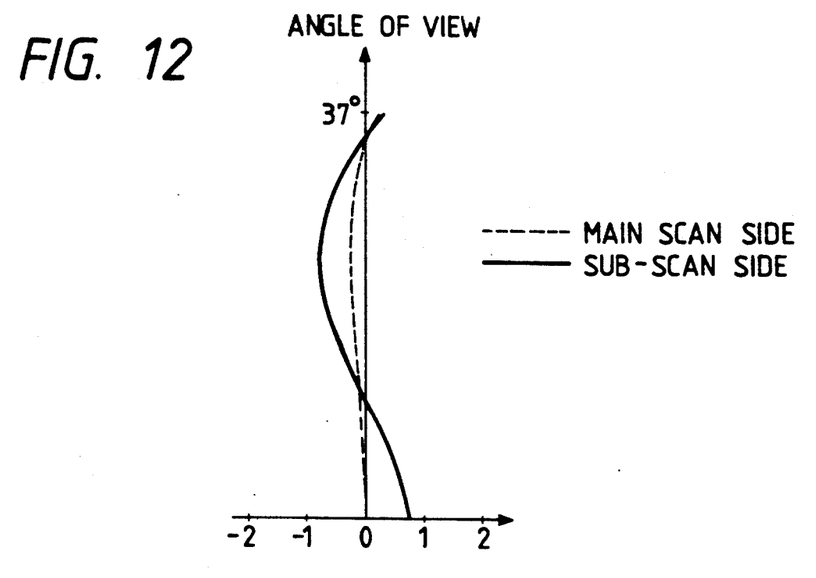
FIG. 12 shows an image plane distortion in the second embodiment.
Figure 13:
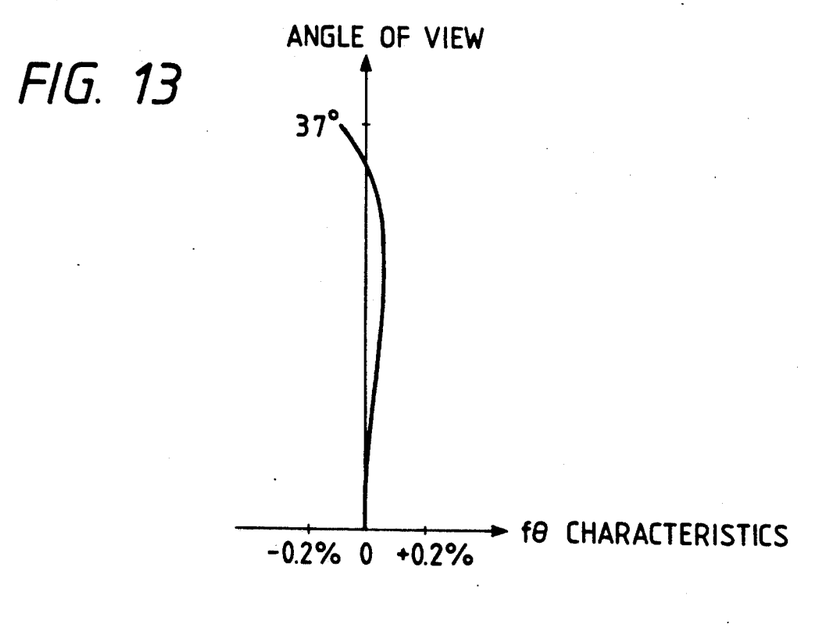
FIG. 13 shows an fθ characteristic in the second embodiment.
Figure 14:
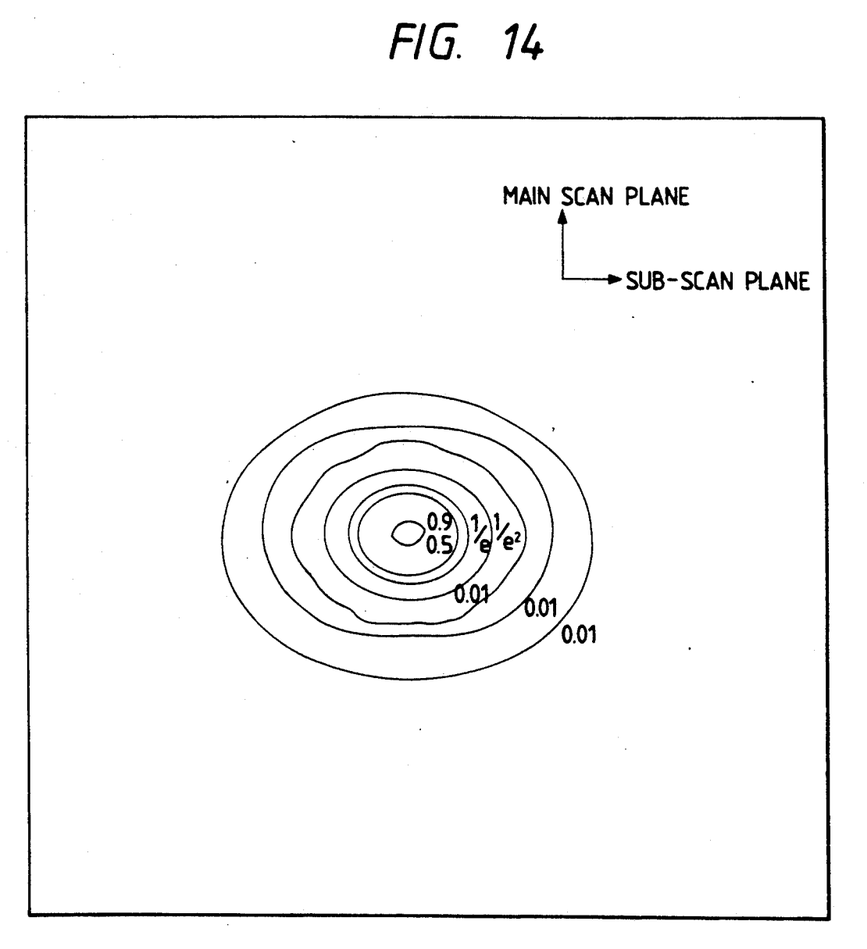
FIG. 14 shows a spot shape at an image angle of 37 degrees in the second embodiment.

The image plane distortion, the $f\theta$ characteristic and the spot shape at the image angle of 37 degrees in the second embodiment are shown in FIGS. 12, 13 and 14. It is seen that, in the second embodiment, a similar effect to that of the first embodiment is attained.

Figure 15:
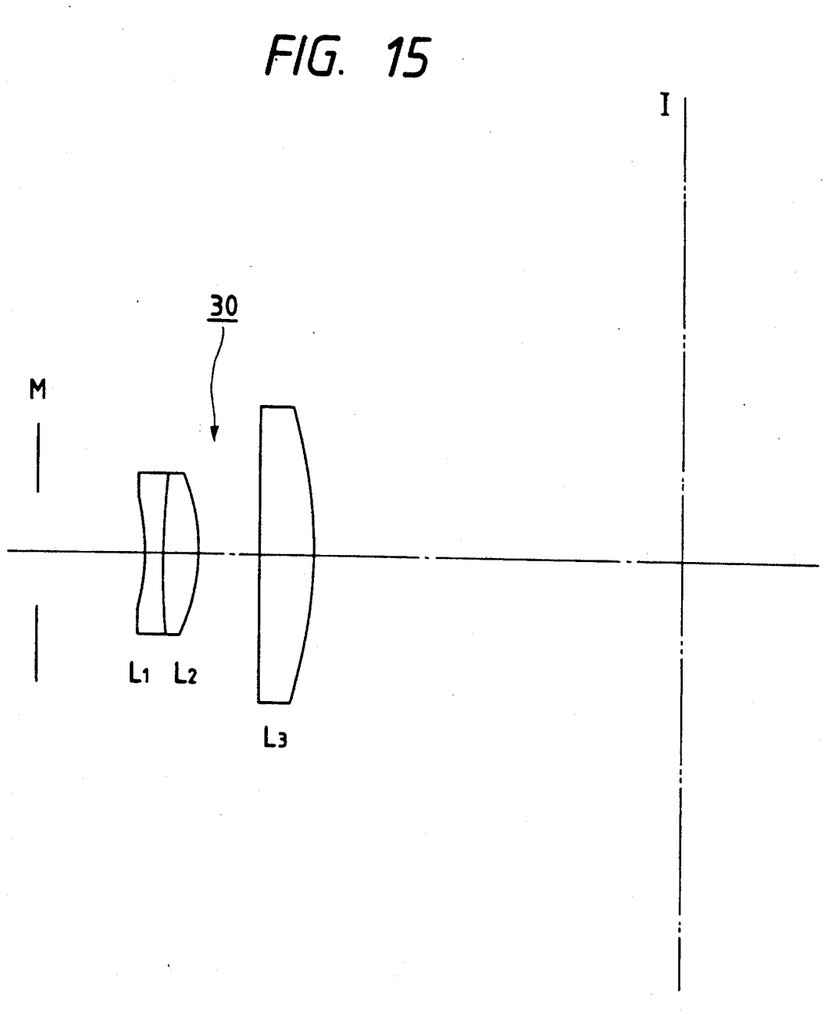
FIG. 15 shows a main scan sectional view of a third embodiment.

A third embodiment of th present invention is shown in FIG. 15. An $f\theta$ lens 30 comprises a concave spherical lens $L_1$, a convex spherical lens $L_2$ and a toric lens $L_3$, arranged in this order as viewed from a mirror plane M.

A specific example of the $f\theta$ lens 30 is shown in Table 4. The convention of symbols is same as that in Table 2.

TABLE 4

| | $d_0 = 15.62$ | $n_0 = 1$ |
|---|---|---|
| $r_1 = -62.45$ | | |
| | $d_1 = 4.31$ | $n_1 = 1.51$ |
| $r_2 = 192.01$ | | |
| | $d_2 = 0.11$ | $n_2 = 1$ |
| $r_3 = 192.01$ | | |
| | $d_3 = 9.16$ | $n_3 = 1.62$ |
| $r_4 = -51.56$ | | |
| | $d_4 = 15.19$ | $n_4 = 1$ |
| $r_{51} = 0$ | | |
| $r_{52} = -33.86$ | | |
| | $d_5 = 14.08$ | $n_5 = 1.62$ |
| $r_{61} = -120.89$ | | |
| $r_{62} = -15.51$ | | |
| | $d_6 = 94.44$ | $n_6 = 1$ |
| | $f = 100$ | |

Again, in the third embodiment, $r_2 = r_3 < 0$ (that is, $r_2/r_3 \leq 1$) is met and the air lens between the lenses $L_1$ and $L_2$ has a positive power.

Figure 16:
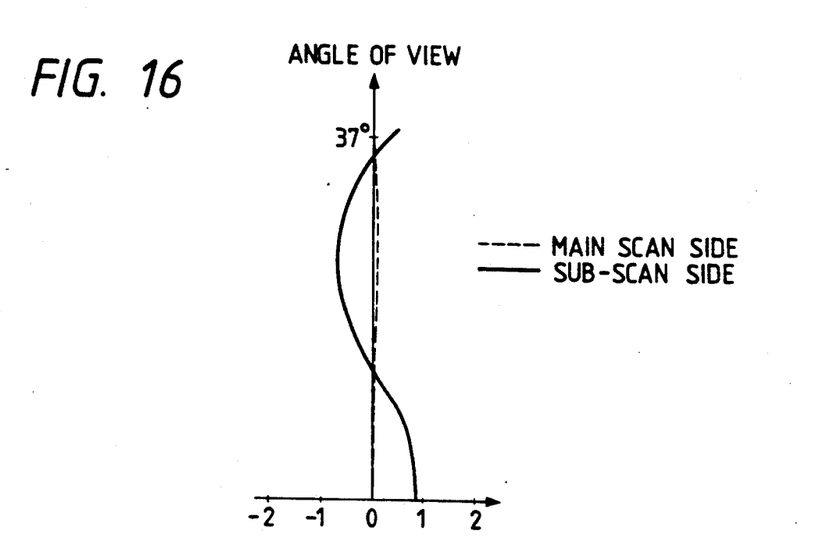
FIG. 16 shows an image plane distortion in the third embodiment.
Figure 17:
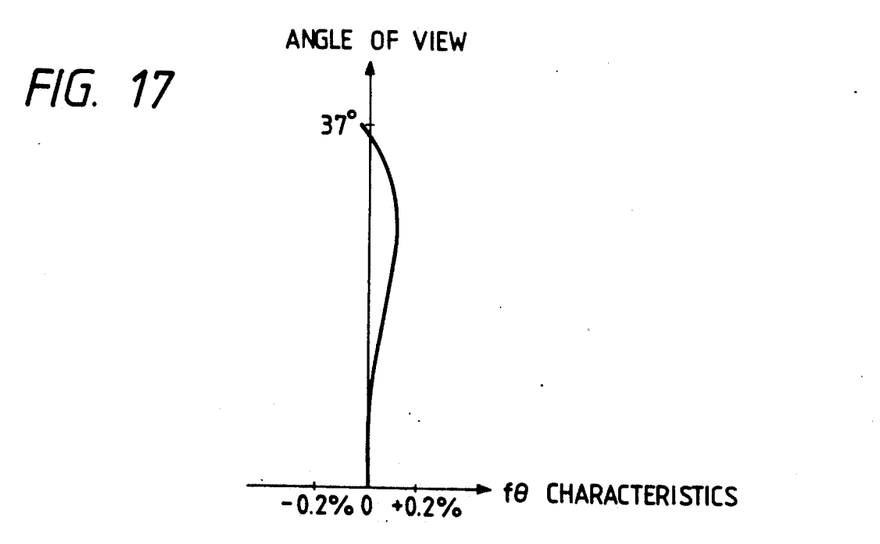
FIG. 17 shows an $f\theta$ characteristic in the third embodiment.
Figure 18:
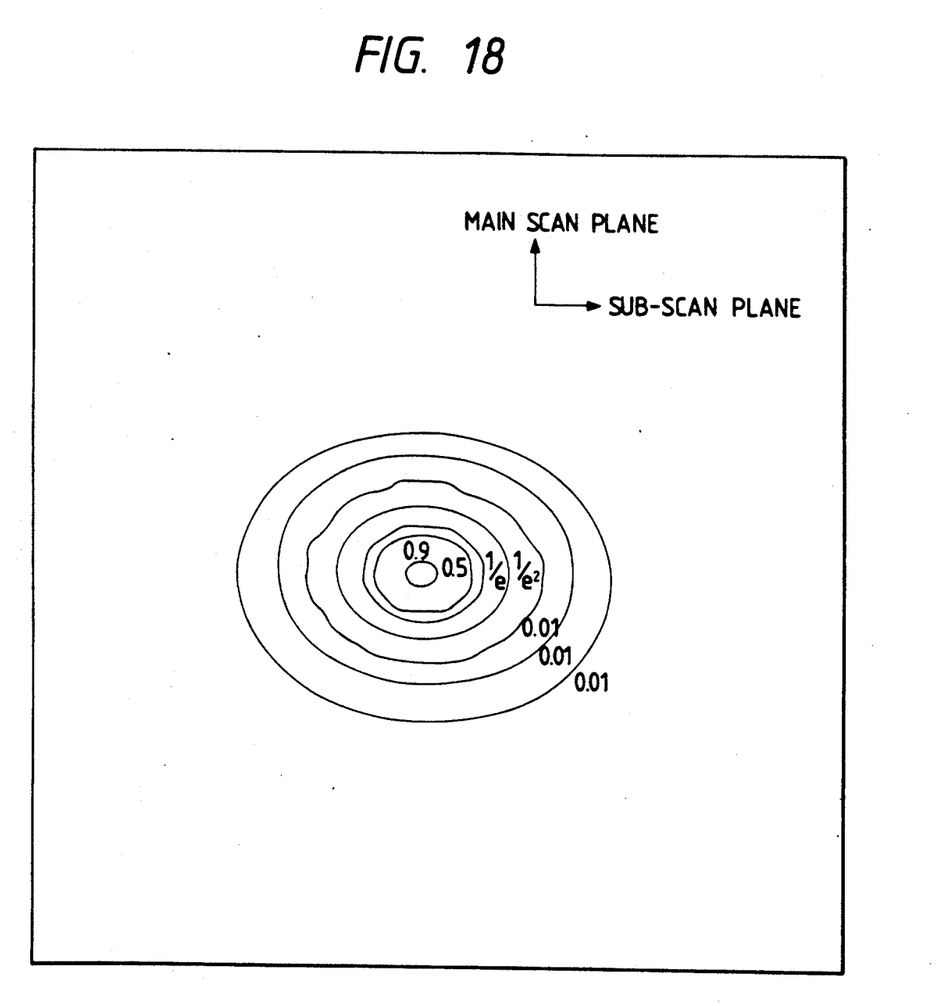
FIG. 18 shows a spot shape at an image angle of 37 degrees in the third embodiment.

The image plane distortion, the $f\theta$ characteristic and the spot shape at the image angle of 37 degrees of the $f\theta$ lens 30 are shown in FIGS. 16, 17 and 18, respectively. It is seen that, in the third embodiment, a similar effect to that of the first embodiment is attained.

The $f\theta$ lens of the present invention which is used in the scanning optical system and has the skew correction function (i.e., the fall-down correction due to fall-down or skew at a surface) has the first lens, the second lens and the third lens arranged in this order as viewed from the deflection plane. The first lens has a negative power in the main scan plane, the second lens has a positive power in the main scan plane, the third lens has a toric plane and a positive power is the main scan plane, and the air lens between the first lens and the second lens has a positive power in the main scan plane.

Preferably, the first lens is a concave spherical lens, the second lens is a convex spherical lens and the third lens is a toric lens.

A more remarkable effect is attained when the following condition is met:

$$-2.2 \leq f/r_3 \leq 1.7$$

where $r_2$ and $r_3$ are radii of curvature of the concave spherical lens and the convex spherical lens, respectively, and f is a focal distance of the overall lens system.

If $f/r_3$ deviates from the above range, the image plane distortion in the main scan plane is deteriorated and it is difficult to maintain the spot diameter fine over the entire image plane.

More preferably, when the condition $$r_2/r_3 \leq 1$$

is met, more effect is attained.

If $r_2/r_3 > 1$, the power of the air lens is negative and the spot shape is degraded.

If $r_2/r_3 < 0$, the spot shape is degraded. Therefore, $0 \leq r_2/r_3$ is desirable.

In accordance with the $f\theta$ lens of the present invention, good spot shape is maintained even at a large image angle area and the scanning optical system which is compact and yet has a high resolution is attained.

I claim:

1. An $f\theta$ lens having a fall-down correction function for use in a scanning optical system comprises:
   a first lens having a negative power in a main scan plane;
   a second lens having a positive power in the main scan plane and arranged next to said first lens;
   a third lens having a toric plane and a positive power in the main scan plane and arranged next to said second lens; and
   an air lens formed between said first lens and said second lens having a positive power in the main scan plane.

2. An $f\theta$ lens according to claim 1 wherein said first lens is a spherical lens having a negative power, said second lens is a spherical lens having a positive power and said third lens is a toric lens.

3. An $f\theta$ lens according to claim 2 wherein a condition $$-2.2 \leq f/r_3 \leq 1.7$$

is met, where $r_3$ is a radius of curvature of a surface of said second lens facing said first lens and f is a focal distance of the overall lens system.

4. An $f\theta$ lens according to claim 3 wherein a condition $$r_2/r_3 \leq 1$$

is met, where $r_2$ is a radius of curvature of a surface of said first lens facing said second lens and $r_3$ is a radius of curvature of a surface of said second lens facing said first lens.

5. A scanning optical system having a fall-down correction function comprising:
   a light source unit;
   a first optical system for linearly focusing a light beam emitted from said light source unit;
   a deflector having a deflecting reflection plane arranged in a vicinity of a linear image formed by said first optical system; and
   a second optical system for focusing the light beam deflected by said deflector onto a predetermined plane;

said second optical system having a first lens, a second lens and a third lens arranged in this sequence as viewed from said deflector, said first lens having a negative power in a main scan plane, said second lens having a positive power in the main scan plane, said third lens having a toric plane and a positive power in the main scan plane, and an air lens formed between said first lens and said second lens having a positive power in the main scan plane.

6. A scanning optical system according to claim 5 wherein said first lens is a spherical lens having a negative power, said second lens is a spherical lens having a positive power and said third lens is a toric lens.

7. A scanning optical system according to claim 6 wherein a condition $$-2.2 \leq f/r_3 \leq 1.7$$

is met, where $r_3$ is a radius of curvature of a surface of said second lens facing said first lens and f is a focal distance of the overall lens system.

8. A scanning optical system according to claim 7 wherein a condition $$r_2/r_3 \leq 1$$

is met, where $r_2$ is a radius of curvature of a surface of said first lens facing said second lens and $r_3$ is a radius of curvature of a surface of si second lens facing said first lens.

9. A laser beam printer comprising:
a light source unit;
a first optical system for linearly focusing a light beam emitted from said light source unit;
a deflector having a deflecting reflection plane arranged in a vicinity of a linear image formed by said first optical system;
a second optical system for focusing the light beam deflected by said deflector;
said second optical system having a first lens, a second lens and third lens arranged in this sequence as viewed from said deflector,
said first lens having a negative power in a main scan plane, said second lens having a positive power in the main scan plane, said third lens having a toric plane and a positive power in the main scan plane, and an air lens formed between said first lens and said second lens having a positive power in the main scan plane, and
a light reception medium for receiving the light beam focused by said second optical system.

10. A laser beam printer according to claim 9 wherein said first lens is a spherical lens having a negative power, said second lens is a spherical lens having a positive power and said third lens is a toric lens.

11. A laser beam printer according to claim 10 wherein a condition $$-2.2 \leq f/r_3 \leq 1.7$$

is met, where $r_3$ is a radius of curvature of a surface of said second lens facing said first lens and f is a focal distance of the overall lens system.

12. A laser beam printer according to claim 11 wherein a condition $$r_2/r_3 \leq 1$$

is met, where $r_2$ is a radius of curvature of a surface of said first lens facing said second lens and $r_3$ is a radius of curvature of a surface of said second lens facing said first lens.

* * * * *

UNITED STATES PATENT AND TRADEMARK OFFICE
CERTIFICATE OF CORRECTION

PATENT NO. : 5,136,412

DATED : August 4, 1992

INVENTOR(S) : JUN MAKINO

Page 1 of 2

It is certified that error appears in the above-identified patent and that said Letters Patent is hereby corrected as shown below:

<u>Column 4</u>:

Line 47, "Accordingly" should read --Accordingly,--

Line 56, Q: "keep of" should read --kept in--.

<u>Column 6</u>:

Line 24, "function" should read --function,--.

Line 37, "claim 1" should read --claim 1,--.

Line 41, "claim 2" should read --claim 2,--.

Line 49, "claim 3" should read --claim 3,--.

Line 59, "function" should read --function,--.

<u>Column 7</u>:

Line 12, "claim 5" should read --claim 5,--.

Line 16, "claim 6" should read --claim 6,--.

Line 25, "claim 7" should read --claim 7,--.

Line 33, "of si" should read --of said--.

Line 35, "printer" should read --printer,--.

UNITED STATES PATENT AND TRADEMARK OFFICE
CERTIFICATE OF CORRECTION

PATENT NO. : 5,136,412

DATED : August 4, 1992

INVENTOR(S) : JUN MAKINO

Page 2 of 2

It is certified that error appears in the above-identified patent and that said Letters Patent is hereby corrected as shown below:

Column 8:

Line 7, "and" should read --and a--.

Line 18, "claim 9" should read --claim 9,--.

Line 22, "claim 10" should read --claim 10,--.

Line 30, "claim 11" should read --claim 11,--.

Signed and Sealed this

Twenty-first Day of September, 1993

*Attest:*

*Attesting Officer*

BRUCE LEHMAN

*Commissioner of Patents and Trademarks*